(12) United States Patent
Held et al.

(10) Patent No.: US 12,515,426 B2
(45) Date of Patent: Jan. 6, 2026

(54) PROCESS AND APPARATUS FOR LABELLING A GREEN TYRE FOR BICYCLES

(71) Applicant: Pirelli Tyre S.p.A., Milan (IT)

(72) Inventors: Alessandro Held, Milan (IT); Lorenzo Roberti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/720,206

(22) PCT Filed: Nov. 28, 2022

(86) PCT No.: PCT/IB2022/061466
§ 371 (c)(1),
(2) Date: Jun. 14, 2024

(87) PCT Pub. No.: WO2023/119010
PCT Pub. Date: Jun. 29, 2023

(65) Prior Publication Data
US 2025/0050605 A1 Feb. 13, 2025

(30) Foreign Application Priority Data
Dec. 22, 2021 (IT) .......... 102021000032090

(51) Int. Cl.
B29D 30/06 (2006.01)
B29D 30/72 (2006.01)

(52) U.S. Cl.
CPC ......... B29D 30/0681 (2013.01); B29D 30/72 (2013.01)

(58) Field of Classification Search
CPC ...... B29D 2030/726; B29D 2030/3085; B29D 2030/549
See application file for complete search history.

(56) References Cited

U.S. PATENT DOCUMENTS

| 1,989,676 A | 2/1935 | Bodle |
| 5,645,669 A | 7/1997 | Crankshaw et al. |

(Continued)

FOREIGN PATENT DOCUMENTS

| EP | 1555114 A1 | 7/2005 |
| JP | 5770709 A | 5/1982 |
| JP | S56159146 A | * 10/1986 |

(Continued)

OTHER PUBLICATIONS

Murayama. JPS56159146A. 1986. Machine Translation by ESpaceNet. <https://worldwide.espacenet.com/patent/search/family/013222748/publication/JPS56159146A?q=pn%3DJPS56159146A>. Accessed Aug. 15, 2025. (Year: 2025).*

(Continued)

*Primary Examiner* — Galen H Hauth
*Assistant Examiner* — Alexander D Booth
(74) *Attorney, Agent, or Firm* — Finnegan, Henderson, Farabow, Garrett & Dunner, L.L.P.

(57) ABSTRACT

The invention relates process and an apparatus for labeling a green bicycle tire. The process comprises-fitting a tyre (2) around a support table (11): —positioning, in a pressing area (23) arranged on the support table (11), a tread junction (6a) carried by the tyre (2) fit around the support table (11); —applying at least one label (32) on the tyre (2); —pressing the tread junction (6a) during the application of said at least one label (32).

15 Claims, 10 Drawing Sheets

(56) References Cited

U.S. PATENT DOCUMENTS

2006/0048878 A1 3/2006 Ogawa
2014/0311664 A1 10/2014 Jackson et al.

FOREIGN PATENT DOCUMENTS

KR 20140079590 A 6/2014
KR 1020160021923 A 2/2016

OTHER PUBLICATIONS

International Search Report form the European Patent Office in corresponding International Application No. PCT/IB2022/061466 mailed Mar. 9, 2023.
Written Opinion of the International Searching Authority from the European Patent Office in corresponding International Application No. PCT/IB2022/061466 mailed Mar. 9, 2023.

\* cited by examiner

PROCESS AND APPARATUS FOR LABELLING A GREEN TYRE FOR BICYCLES

This application is a national stage entry application under 35 U.S.C. § 371 of International Application No. PCT/IB2022/061466, filed on Nov. 28, 2022, and claims priority to Italian Application No. 102021000032090, filed Dec. 22, 2021; the contents of each application is incorporated herein by reference in its entirety.

The present invention relates to a process for labelling a green tyre for bicycles. The invention also relates to an apparatus for labelling tyres for bicycles, usable according to the aforesaid process, as well as a building process integrating the labelling process itself.

The terms "radial" and "axial" and the expressions "radially inner/outer" and "axially inner/outer" are used referring to the radial direction and the axial direction of the tyre, i.e. to a direction perpendicular to the axis of rotation of the tyre and a direction parallel to the axis of rotation thereof, respectively.

The terms "circumferential" and "circumferentially" are instead used with reference to the annular extension of the tyre. Under normal operating conditions this extension is circular, but in certain steps of the manufacturing process, the tire can assume a different configuration, in particular flattened with two predominantly straight or arched sections, interconnected by U-shaped terminal sections. For simplicity, also in these cases reference will be made to the "circumferential extension" identifying with this expression the extension assumed by the tire along the rolling direction under operating conditions.

The building of a tyre for bicycles usually provides that one or more carcass plies are applied according to a cylindrical configuration around an outer surface of a building drum. A pair of bead cores are fitted or applied each around one of the axially opposite end flaps of the carcass ply. The end flaps are then turned up around the respective bead cores. A tread band is then applied, typically made in the form of a strip of elastomeric material cut to size, which is wound around the carcass ply lying against the building drum, in an axially centred position with respect to the bead cores. Between the cores and the axially opposite edges of the tread band, suitably spaced from the cores themselves, the opposite sides of the finished tire in operating conditions can be identified.

At the end of the winding, the opposite ends of the tread band are slightly overlapped and mutually joined by means of a head-to-head joint.

The mutual axial distance between the bead cores remains unchanged during the entire building process, including the application of the tread band. This process aspect represents a unique feature that distinguishes bicycle tyres from tyres for motor vehicles. For the latter, in fact, a mutual approach step of the bead cores is normally provided to shape the carcass structure according to a toroidal configuration in the coupling step with a belt structure having a diameter greater than that of the bead cores.

Once the building has been completed, the built green tyre for bicycle is removed from the drum and transferred in a vulcanisation press to be subjected to a moulding and vulcanisation treatment aimed at determining the structural stabilisation thereof via cross-linking of the elastomeric material present therein, as well as optionally imprinting a desired tread design on the tread band.

Following the application of the tread band, labelling processes are normally required.

Such processes, such as visible in the videos https://youtu.be/e3sHyJKaFMo (time counter from 15' 20" to 15' 50"—last seen 17 Dec. 2021) and https://youtu.be/TN1lrm79Bdg (time counter from 4' 30" to 4' 50"—last seen 17 Dec. 2021) typically include a manual pressing action on the building drum at room temperature or hot exerted on the head-head junction of the tread band, to promote adhesion and make the thickness uniform, and subsequently the application, also manual, of labels bearing the trademark and/or other identification or ornamental signs in the areas of the sidewalls.

An example of a thermo-adhesive label for bicycle tires is described in JP-S57-70709.

KR-10-2016-0021923 describes a device for applying barcodes on green automotive tires, wherein a suction head picks up a barcode from a container to transfer it to the tire supported by a manipulator that has previously removed it from a building machine.

The Applicant has however noted that bicycle tyres, especially when green, are often without a structural consistency sufficient to allow the proper handling thereof by means of mechanical devices.

This is because bicycle tyres are often provided with bead cores in non-metallic material, for example in composite material based on natural or synthetic fibres (carbon, aramid, etc.) to allow the finished tyre to be folding. Moreover, as stated above, bicycle tyres are often devoid of reinforcement belt layers interposed between the carcass ply or plies and the tread band.

In particular, the Applicant has noted that once removed from the building drum, a green bicycle tyre tends to deform under the effect of internal stresses and of its own weight, and this is done randomly and uncontrollably both in circumferential direction, where the circular shape is lost due to the low resistance of the bead cores, and in the axial extension direction due to the shrinkage of the materials or the weight of the components thereof.

Also for these reasons, the labelling processes contemplated in the building cycle of tyres for bicycle are currently carried out manually, without removing the tire from the building drum.

During the execution of these operations, the building drum is adapted to impart the necessary stability to the tire being processed and to adequately counteract the thrusts exerted thereon during the pressing of the tread junction and the application of the labels.

The Applicant has observed that the labelling processes of bicycle tires carried out before vulcanisation with known processes and equipment tend to excessively increase the processing times, and emphasise some criticalities that can be found in their correct execution for the purposes of product quality.

In particular, the manual application of the labels and the pressing of the tread junction require time and precision, in order to maintain the quality features of the product.

The Applicant has also observed that the execution of the labelling processes on the green tire still mounted on the building drum, involves a significant increase in the execution times of the processing cycle, especially when the application of a certain number of labels on a same tire is required. In fact, both the pressing of the tread junction and the application of each label are necessarily performed one after the other, consequently adding together their execution times before being able to disassemble the tire from the building drum and start building the following tyre.

The Applicant has therefore perceived that by separating the pressing and labelling operations from those of the actual building and carrying out the aforementioned operations with dedicated equipment it would be possible to overcome the drawbacks encountered above, in particular in terms of productivity and repeatability of the results.

Finally, the Applicant has found that by fitting the green tire removed from the building drum onto a support table equipped in a suitable manner to keep the tire extended, it is possible to carry out the application of one or more labels simultaneously, accurately and repeatably at the same time as the pressing of the tread junction.

More in particular, the invention relates to a process for labelling a green tyre for bicycles.

Preferably, it is provided to fit a tyre around a support table. Preferably, it is provided to position, in a pressing area arranged on the support table, a tread junction carried by the tyre fit around the support table.

Preferably, it is provided to apply at least one label on the tire.

Preferably, it is provided to press the tread junction during the application of said at least one label.

In a further aspect thereof, the invention relates to a process for building tyres for bicycles.

Preferably, it is provided to assemble a plurality of components on a building drum to make a green tire.

Preferably, it is provided to carry out labelling processes on the green tire.

Preferably, it is provided to vulcanise the tire.

Preferably, the execution of the labelling processes takes place by carrying out the labelling process according to the first aspect of the invention.

A further aspect of the invention relates to an apparatus for labelling tyres for bicycles.

Preferably, a support table is provided carrying two mutually opposite contrast faces peripherally delimited on a front side, a rear side opposite the front side and two terminal sides respectively opposite between the front side and the rear side.

Preferably, the support table is configured to receive a green tyre for bicycle fitted around it and extended parallel to the front side and the rear side.

Preferably, a presser is provided, movable towards a pressing area carried by one of the contrast faces, in order to press a tread junction carried by the tyre fit around the support table.

Preferably, at least one labelling pad is provided, movable towards one of the contrast faces, in order to apply at least one label on the tyre fit around the support table.

The Applicant believes that the engagement of the tire on the support table facilitates the application of the label or labels and the simultaneous pressing of the tread junction, to the advantage of execution precision, result repeatability and reduction of processing waste. The simultaneous execution of the pressing on the tire at the same time as the application of the label or labels also allows a significant reduction in the time required for the labelling operations, and greater accuracy in the execution of the same.

In at least one of the above aspects, convenient embodiments of the invention may comprise one or more of the following preferential features.

Preferably, the action of pressing the tread junction is executed by a presser pushed against the tyre, interposed between the presser and the support table.

The parameters relating to temperature, thrust force and time of application of the same are easily controlled for obtaining an optimal and repeatable result.

Preferably, fitting the tyre comprises extending the tyre according to an elongated configuration wherein a circumferential extension of the tyre has two main sections substantially parallel to each other, mutually connected by two U-shaped connector sections.

This facilitates the automated execution of labelling and pressing, exploiting the existing spaces around the support table for the purpose of installing the equipment used to carry them out.

Preferably, it is further provided to stretch the tyre by moving the U-shaped connector sections away from each other before applying said at least one label.

Correct adhesion of the tire against the support table is thus favoured, preparing the latter to provide an effective seat for contrasting the thrusts exerted on the tire, to the advantage of the correct execution of the processes.

Preferably, stretching the tire comprises placing said main sections against respectively opposite contrast faces of the support table.

Preferably, stretching the tyre comprises moving at least one stretcher away from a respective terminal side of the support table.

According to the Applicant, it is thus possible to obtain a greater adaptability of the process without implying constructive complications, by modulating the displacements of the stretchers according to the different circumferential dimensions of the tires being processed.

Preferably, stretching the tire comprises moving at least two stretchers away from respectively opposite end sides of the support table.

The maintenance of a centred positioning of the tire with respect to the support table is thus favoured, to the advantage of the process accuracy and quality.

Preferably, the support table has two respectively opposite contrast faces, each one operating in support against one of the main sections of the extended tire.

It is thus possible to provide a reliable support to both main sections of the tire, for the simultaneous application of labels in respective points of the circumferential extension.

Preferably, the green tire has two axially opposite beads, two sidewalls extending from the respective beads and a tread band axially interposed between the sidewalls and carrying the tread junction.

Preferably, applying said at least one label comprises pressing a labelling pad against one of the main sections of the extended tire.

Preferably, said at least one label is applied on at least one sidewall of the tire.

Preferably, at least two labels are applied, each on a respective sidewall of the tire.

Preferably, at least two labels are applied simultaneously on a respective sidewall of the tire.

Preferably, said at least two labels are each applied at one of the main sections of the extended tire.

The simultaneous application of two labels in different positions on the same sidewall allows reducing the labelling times, in line with those required for pressing the tread junction.

Preferably, the application of the labels on the respective sidewalls takes place at different times respectively.

According to the Applicant, it is thus possible to obtain a greater adaptability of the process without implying constructive complications, by modulating the displacements of the labelling pad transversely to the tire according to the different width dimensions of the tires being processed.

Preferably, the presser operates in thrust relationship on the tread junction during the application of the labels on both the sidewalls.

The pressing of the tread junction can thus be obtained in a longer time and at a lower temperature, so as to favour a better uniformity in the thickness of the tread without triggering early molecular cross-linking phenomena.

Preferably, it is also provided to produce on the tread band an asymmetric impression with respect to the axial middle line plane of the tire.

It is thus possible to impress in the tread band an indication of the orientation assumed by the tire during building, which can be used to establish the orientation of the tire itself for the purpose of subsequent loading in a vulcanisation press and/or any subsequent identification of the causes of any defects.

Preferably, said impression is made by means of the presser during pressing.

Preferably, attraction forces against the support table are applied to each of the main sections of the extended tire.

The positioning stability of the tire on the support table is thus favoured, even along the main section arranged below with respect to the support table oriented horizontally.

Preferably, for at least one of the main sections the forces of attraction are applied by means of a suction action.

Preferably, the application of the label comprises interposing between the labelling pad and the tire fitted on the support table at least one labelling tape carrying said label.

Preferably, the label is applied by thermal transfer from the labelling tape to the tire.

Preferably, the green tire on the building drum has a substantially cylindrical annular shape.

Preferably, the labelling processes are at least partially executed during the assembly of annular components of another tyre on the building drum.

A considerable reduction in the cycle time required to complete the building of each tire is thus achieved, since the time required by the labelling operations is masked in the execution of the building of the next tire. During the processing of the next tire on the building drum, the operator in charge of building can also take care of transferring the tire to the support table.

Preferably, at least two labelling pads movable on respectively opposite sides are provided, each towards one of the contrast faces of the support table, in order to simultaneously apply at least two labels along a circumferential extension of the tyre.

Preferably, the support table comprises at least one stretcher movable away from one of the terminal sides in order to stretch the tyre fit around the support table.

Preferably, the support table comprises two stretchers, each movable away from and close to one of the terminal sides.

Preferably, said at least one stretcher comprises at least one roller rotatably engaged to a bracket movable with respect to the support table.

Preferably, a synchronization kinematic mechanism is provided operating between the stretchers in order to move them simultaneously and symmetrically with respect to the respective terminal sides.

Preferably, a load-bearing structure is also provided which cantileverly supports the support table in proximity to the rear side.

Preferably, at least one of the contrast faces has a longitudinal containment seat extending perpendicularly to the terminal sides.

Preferably, the longitudinal containment seat has a front shoulder and a rear shoulder configured for acting each against a bead of the tyre fit around the support table.

Preferably, at least one movement actuator is also provided which operates on the support table to move it with respect to the load-bearing structure parallel to the terminal sides.

Preferably, the support table is positionable in a first work position in which it is approached to the load-bearing structure.

Preferably, the support table is positionable in a loading-unloading position in which it is moved away from the load-bearing structure.

Preferably, the support table is positionable in a second work position in which it is situated between the first work position and the loading-unloading position.

Preferably, in the first work position the pressing area is positioned along a movement path of the presser.

Preferably, each of the longitudinal containment seats comprises a first lateral portion and a second lateral portion, situated on respectively opposite sides with respect to a longitudinal middle line.

Preferably, said first lateral portion and second lateral portion are respectively proximate to the front shoulder and to the rear shoulder.

Preferably, in the first work position, the second lateral portion is positioned along a movement trajectory of said at least one labelling pad.

Preferably, in the second work position, the second lateral portion is positioned along a movement trajectory of said at least one labelling pad.

Preferably, in the loading-unloading position the longitudinal containment seat is moved away from the movement path of said at least one labelling pad.

Preferably, the presser is movable together with the support table between the first work position and the second work position.

It is thus possible to keep the presser active on the tread junction even during the movement of the table from the first to the second position and during the application of the labels on the two sidewalls in succession.

Preferably, the presser is mounted at the end of a thrust actuator.

Preferably, the presser is engaged with a slider, movable along a guide structure fixed with respect to the load-bearing structure.

Preferably, the slider is movable parallel to the terminal sides of the support table.

Preferably, the presser has a marking matrix directed towards the support table.

Preferably, the contrast faces of the support table are oriented horizontally.

Preferably, suction nozzles are also provided facing from at least one of the contrast faces and activatable for retaining the tire against the support table.

Preferably, return elements are also provided for guiding at least one labelling tape interposed between the labelling pad and the support table.

Further features and advantages will become more apparent from the detailed description of a preferred but non-exclusive embodiment of a process for labelling a green tyre for bicycle, of an apparatus conveniently usable for labelling bicycle tires according to said process, and a building process integrating the same labelling process according to the present invention.

Such description is given hereinafter with reference to the accompanying drawings, provided only for illustrative and, therefore, non-limiting purposes, in which:

FIG. 1 schematically shows a diametrical section of a green tire for bicycle assembled on a building drum;

FIG. 2 schematically shows a front view of a labelling apparatus according to the present invention, in an operating step in which a green tire being processed is about to be fitted around a support table;

FIG. 3 schematically shows the apparatus of FIG. 2 in a perspective view;

Figure 8:
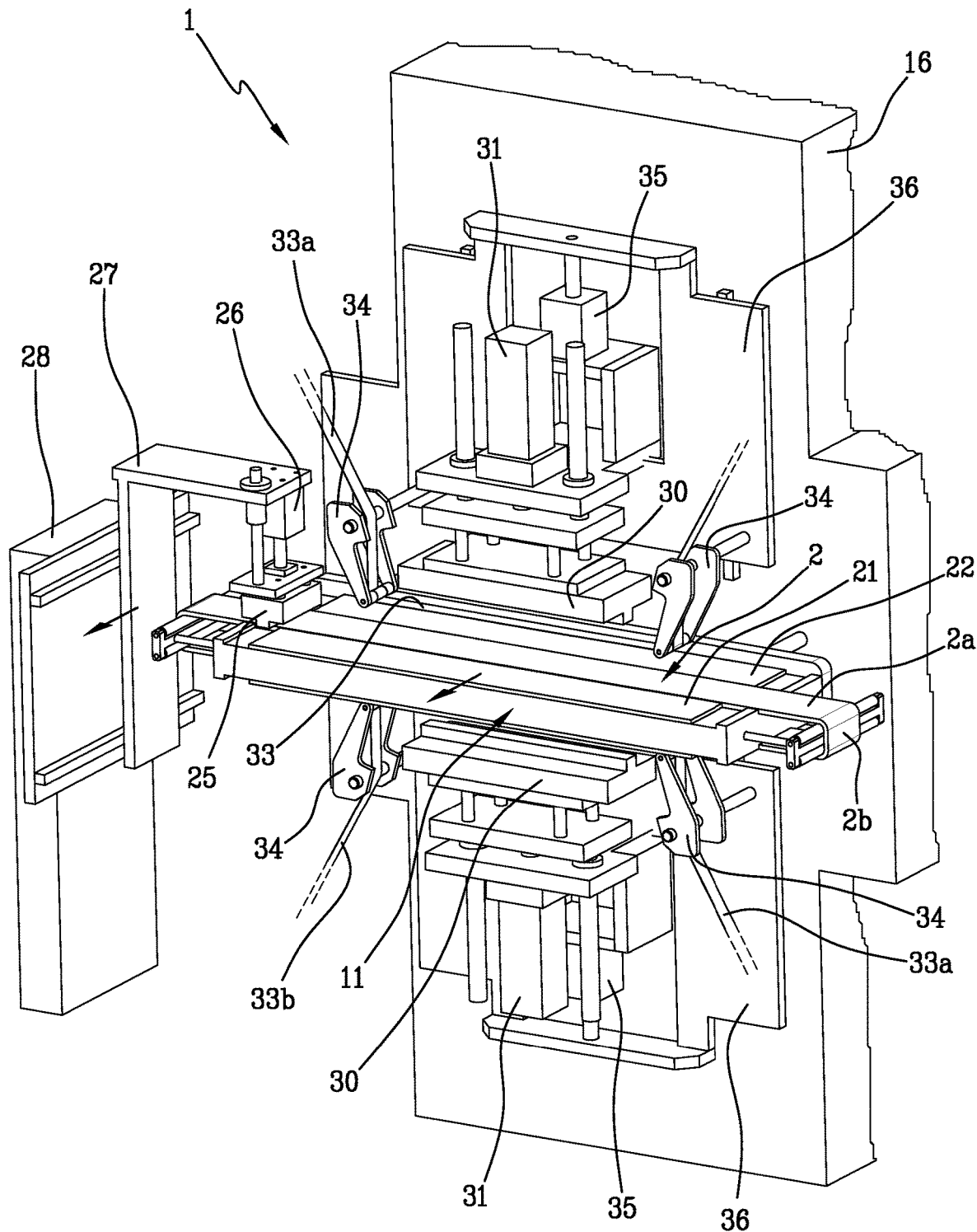
Figure 9:
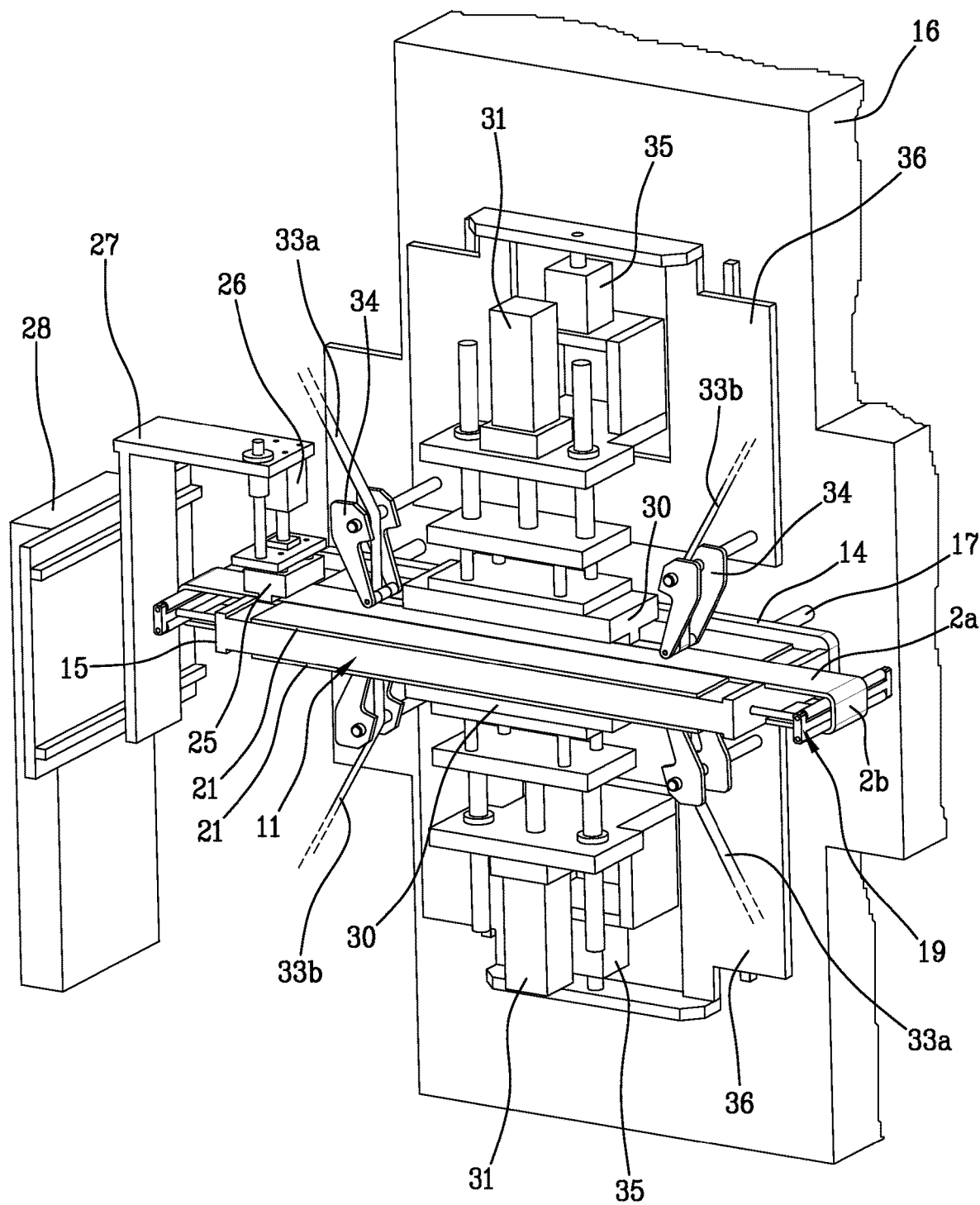
Figure 10:
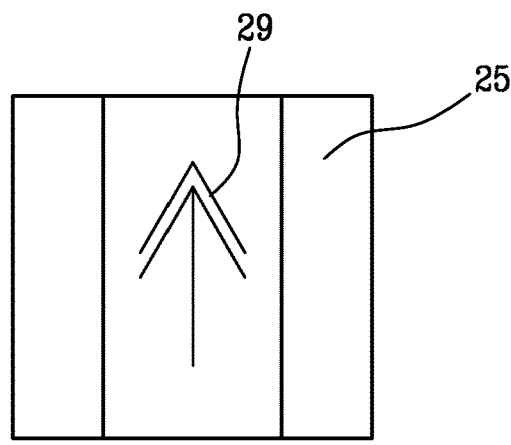
Figure 11:
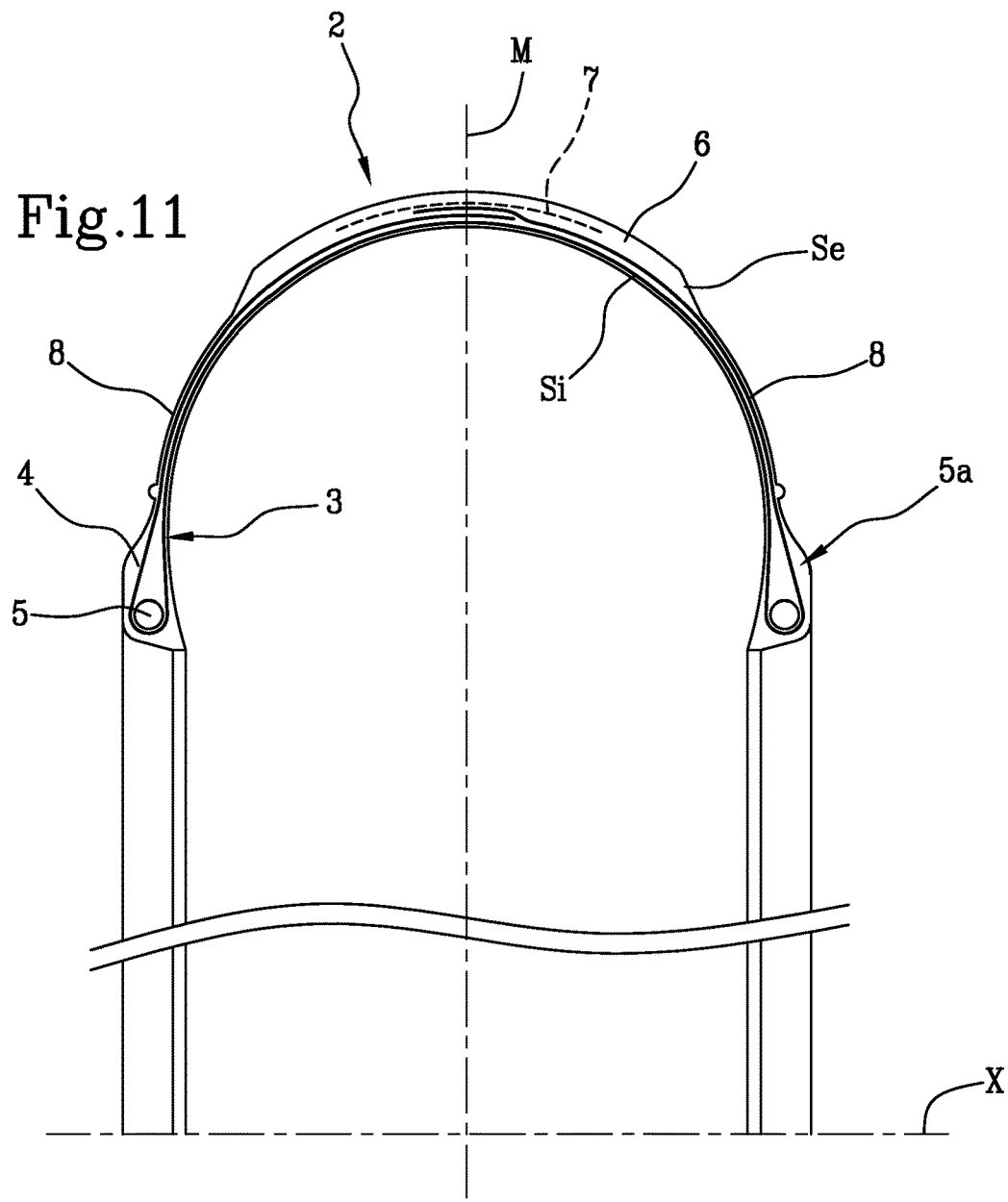

FIG. 8 schematically shows a perspective view of the apparatus during the preparation of the tire for the application of second labels;

FIG. 9 schematically shows a perspective view of the apparatus during the application of second labels;

FIG. 10 shows an example of a presser seen from below with respect to FIGS. 2 to 9;

FIG. 11 schematically shows a finished bicycle tire in radial section.

With reference to the aforementioned figures, reference numeral 1 indicates as a whole a labelling apparatus for bicycle tires, conveniently usable for carrying out a labelling process according to the present invention.

The present invention is designed for processing tyres 2 for bicycle, of the type schematically exemplified in FIG. 11, for example for use on road, track, mountain bikes, e-bikes, etc.

A radially inner surface 2; can be identified in tyre 2, substantially facing towards a geometric axis of rotation X of the tyre 2, and a radially outer surface Se substantially facing away from the geometric axis of rotation X.

The tyre 1 for bicycle has a carcass structure 3 comprising at least one carcass ply 4 having mutually parallel cords embedded in an elastomeric matrix.

Axially opposite end flaps 4a of the carcass ply or plies 4 are engaged to respective bead cores 5, that is, annular anchoring structures integrated in the areas usually identified by the name of "beads" 5a at which the mechanical engagement between the tyre 2 in use conditions and a respective mounting rim takes place.

A tread band 6, made of elastomeric material, is applied in a radially outer position with respect to the carcass structure 3.

Preferably, at least two layers of cords having a cross pattern, respectively, can be identified in the carcass structure 3. For example, the presence of two carcass plies 4 may be provided, radially superimposed on top of each other, each with the respective cords extending along an inclined direction with respect to the circumferential development of tyre 2 and according to an inclined orientation with respect to the cords belonging to the other carcass ply 4. Alternatively, as shown in FIG. 11, a single carcass ply 4 may be provided, the end flaps 4a whereof, turned up around bead cores 5, extend beyond an axial middle line plane M of the tyre 2, so as to define each a respective layer of cords having crossed orientation with respect to the cords present in the adjacent layer.

Unlike the tyres typically designed to be used on motor vehicles, the tyre 2 for bicycle is generally devoid of a belt structure, that is, of reinforcement belt layers radially interposed between the carcass structure 3 and the tread band 6. In tyres for motor vehicles, these belt layers contribute to increasing the structural strength of the tyre 2 and to stabilising the geometry thereof, especially in the crown area, i.e. in the radially outer areas closer to the tread band 6.

In the tyre 2 for bicycle, however, at least one circumferential protective layer 7 may be provided, the task of which is essentially that of protecting the tire 2 from punctures, interposed between the tread band 6 and the carcass structure 3.

On the radially outer surface Se of the bicycle tire 2, between the axially outer edges of the tread band 6 and the bead cores 5, respective sidewalls 8 preferably defined by portions of carcass ply 4 directly exposed to the external environment can be identified. The bicycle tire 2 is in fact typically devoid of elastomeric coatings applied at the sidewalls 8.

Figure 1:
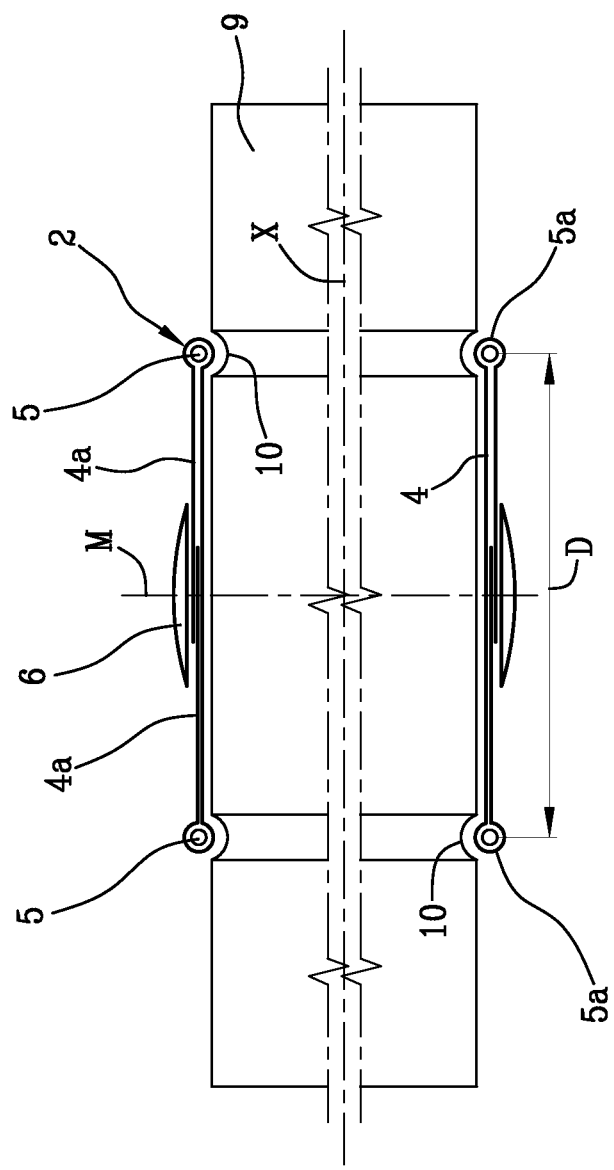
Figure 2:
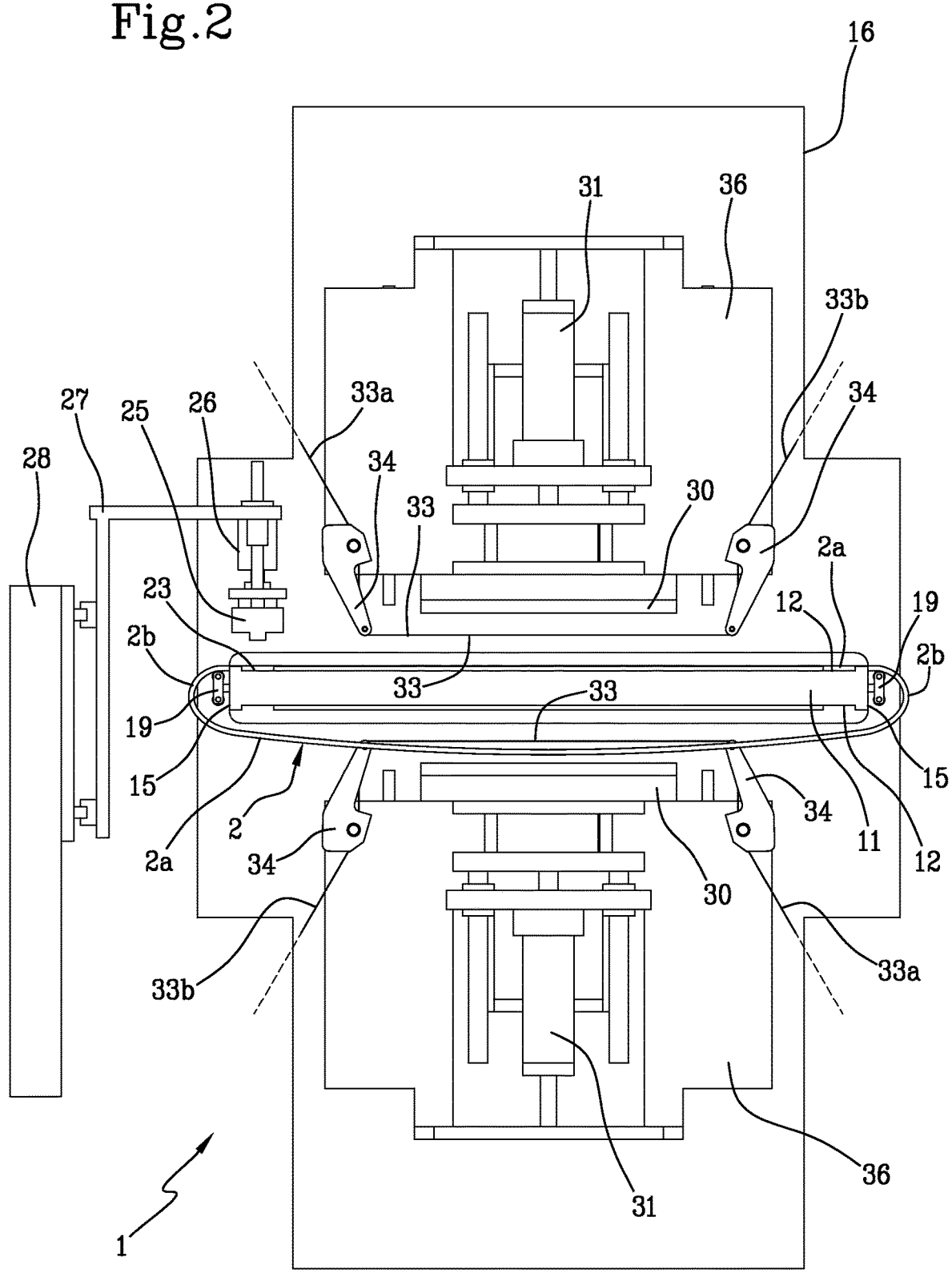

As shown schematically in FIG. 1, the building of the bicycle tire 2 provides that the various annular components, i.e. carcass ply or plies 4, bead cores 5, tread band 6 etc., are sequentially assembled on a building drum 9, not described in detail as it can be implemented in a known manner.

More particularly, it is preferably provided that the carcass ply or plies 4 are deposited in a cylindrical configuration, for example by wrapping around an outer surface of a building drum 9.

The bead cores 5, made for example of composite material based on natural or synthetic fibres and/or metallic material, are applied at a predetermined mutual axial distance D, each around one of the axially opposite end flaps 4a of the carcass ply 4, for example each at a circumferential recess 10 arranged on the building drum 9.

The end flaps 4a of the carcass ply(ies) 4 are then turned up around the respective bead cores 5. During the turning up, the end flaps 4a may be at least partially superimposed on each other and optionally joined in mutual direct contact.

The tread band 6 is then applied around the carcass ply 4, in an axially centred position with respect to the bead cores 5. The tread band, preferably made in the form of an extruded band and cut to size, is preferably wound in a complete revolution around the building drum. When the winding is completed, the opposite ends of the tread band are joined together forming a head-to-head junction, hereinafter referred to as the "tread junction" and marked with 6a in FIG. 4.

If necessary, the application of the tread band 6 may be preceded by the application of said at least one circumferential protective layer 7.

The tread band 6 is preferably applied maintaining the mutual axial distance D of the bead cores 5 virtually unchanged. More in particular, the mutual axial distance D between the bead cores 5 preferably remains unchanged during the entire assembly process, including the application of the tread band 6. During the application of the tread band 6, an axially central portion of said at least one carcass ply 4, extending axially through an axial middle line plane M equidistant from the bead cores 5, lies against the building drum 9 (FIG. 1).

When building is complete, the green tire 2 is therefore in the form of a substantially cylindrical annular band, and can be removed from the building drum 9, after any radial contraction of the latter, to be subsequently subjected to the labelling process according to the present invention.

Being devoid of belt structure and having generally bead cores 5 made from natural or synthetic fibres (carbon, aramid, etc.), the tyre 2 for bicycle tends to deform spontaneously or very easily, also under the effect of its own weight, as soon as it is removed from the building drum 9. Consequently, upon removal from the building drum 9, the circumferential extension of the tire 2 loses its circular shape, assuming a deformed extension according to the manipulations to which it is subjected.

The apparatus 1 has a support table 11 carrying two mutually opposite contrast faces 12, arranged parallel to each other according to a preferably horizontal orientation. The contrast faces 12 are peripherally delimited by a front side 13, a rear side 14 opposite the front side 13 and two terminal sides 15 respectively opposite each extending between the front side 13 and the rear side 14.

Preferably, the support table 11 is supported cantilevered with respect to a column or other fixed load-bearing structure 16, for example by means of guide rods 17 extending between the same load-bearing structure 16 and the aforementioned rear side 14.

At least one motor or other movement actuator 18 with electric or fluid-dynamic drive operates on the support table 11 to move it with respect to the load-bearing structure 16 along the guide rods 17, parallel to the terminal sides 15.

At at least one of the terminal sides 15, preferably at both, a stretcher 19 operates which comprises one or more rollers 19*a* rotatably engaged to a bracket 19*b* movable with respect to the support table 11. Each stretcher 19 is movable towards and away from the support table 11, for example by means of a tensioning actuator not illustrated, parallel to the extension of the contrast faces 12. Preferably, a synchronization kinematic mechanism operates between the stretchers in order to move them simultaneously and symmetrically with respect to the respective terminal sides 15. This synchronization mechanism, not shown or described in detail as it can be implemented in various ways, may for example comprise racks engaged with a toothed pinion, a double-threaded right/left-hand screw driven in rotation by the tensioning actuator, cable tie rods engaged around return elements, or other kinematic constraint elements to synchronize the movements of the stretchers associated with one and the other of the terminal sides 15.

On at least one of the contrast faces 12, preferably on both, there is defined at least one longitudinal containment seat 20 extending perpendicularly to the terminal sides 15 and/or parallel to the rear side 14 and to the front side 13. Preferably, this longitudinal containment seat 20 is delimited between a front shoulder 21 and a rear shoulder 22 respectively facing the front side 13 and the rear side 14 of the support table 11. The front shoulder 21 and the rear shoulder 22 can be obtained on one or more interchangeable inserts, to quickly adapt the apparatus to the processing of tires having different widths.

The support table 11 is suitable for receiving the green tire 2 removed from the building drum 9. To this end, the movement actuator 18 brings the support table 11 into a loading-unloading position, in which it is moved away from the load-bearing structure 16. In this circumstance, the stretchers 19 are preferably approached to the respective terminal sides 15, so that the green tire 2 can be easily fitted around the support table 11, for example manually by an operator responsible for managing and supervising the assembly operations performed on the building drum 9.

During this operation, the tire 2 is stretched according to an elongated configuration, in which its circumferential extension has two main sections 2*a* substantially parallel to each other, arranged along the contrast faces 12 and mutually connected by two U-shaped connector sections 2*b* extending around the respective terminal sides 15.

The operator will take care to position the main sections 2*a* of the tire 2 fitted around the support table 11 inside the longitudinal containment seats 20. The front shoulder 21 and the rear shoulder 22 of each longitudinal containment seat 20 therefore each act against one of the beads 5*a* of the tire 2, along the respective main section 2*a*, so as to promote a stable and predetermined positioning on the support table. 11.

The operator will also take care to position the tread junction 6*a* carried by the tire 2 in a pressing area 23 arranged on the support table 11, for example in proximity to one of the ends of the longitudinal containment seat 20 carried by the contrast face 12 facing up. This pressing area 23 can be conveniently displayed by means of a marking provided on the corresponding contrast face 12.

The stretchers 19 can then be pushed and moved simultaneously away from the respective terminal sides 15 of the support table 11, to adequately stretch the tire 2 by moving the U-shaped connector sections 2*b* away from each other. The main sections 2*a* are consequently approached against the respectively opposite contrast faces 12 of the support table 11. In particular, the main sections 2*a* arranged below, initially arched due to its own weight, will assume a substantially rectilinear course like the upper main section 2*a* which lies on the support table 11.

The synchronous movement of the stretchers 19 helps to maintain a stable positioning of the tire 2, with the tread junction 6*a* correctly positioned on the pressing area 23.

The stabilization of the tire 2 against the support table 11 can be assisted by attraction forces produced on the main sections 2*a*.

Figure 3:
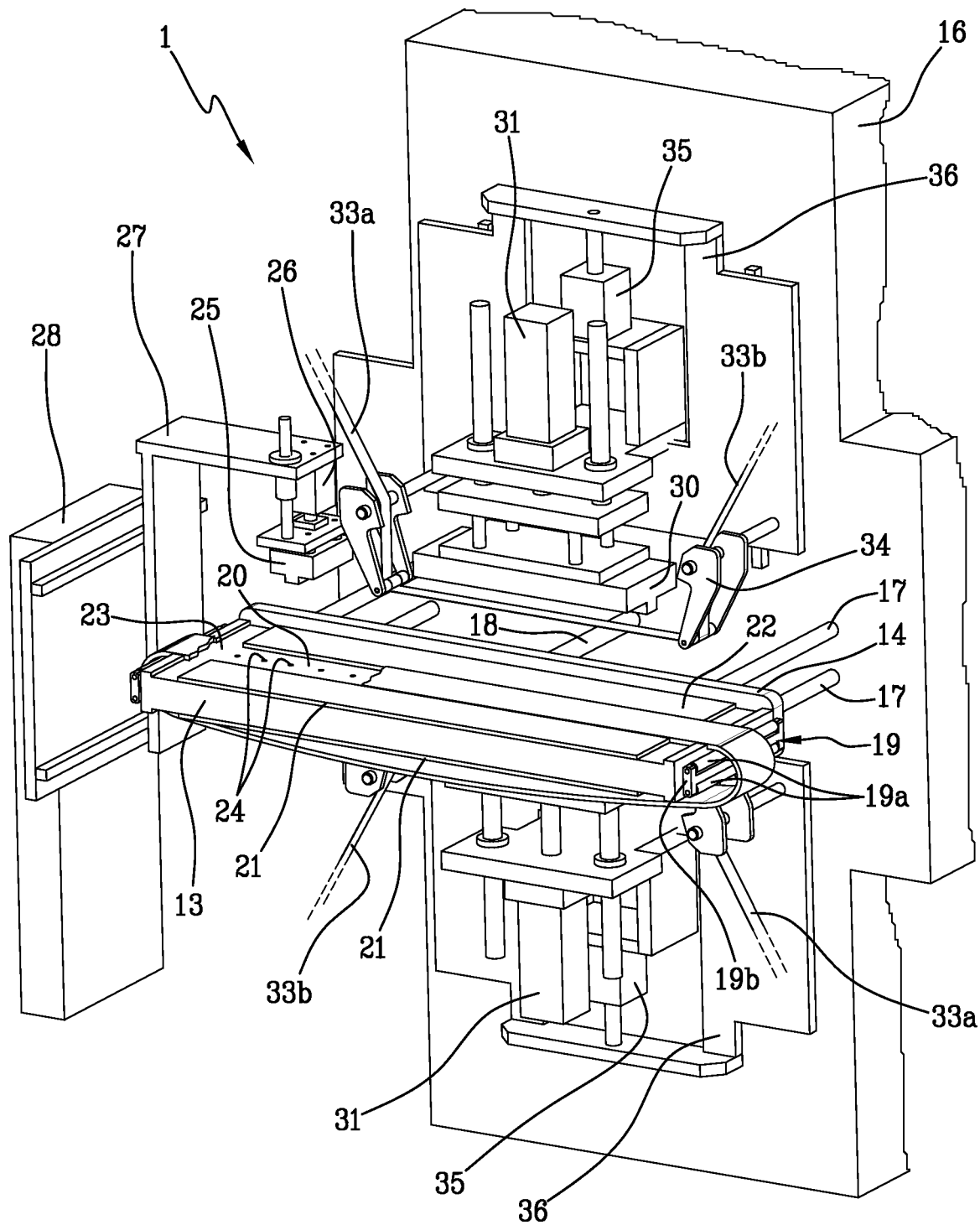
Figure 4:
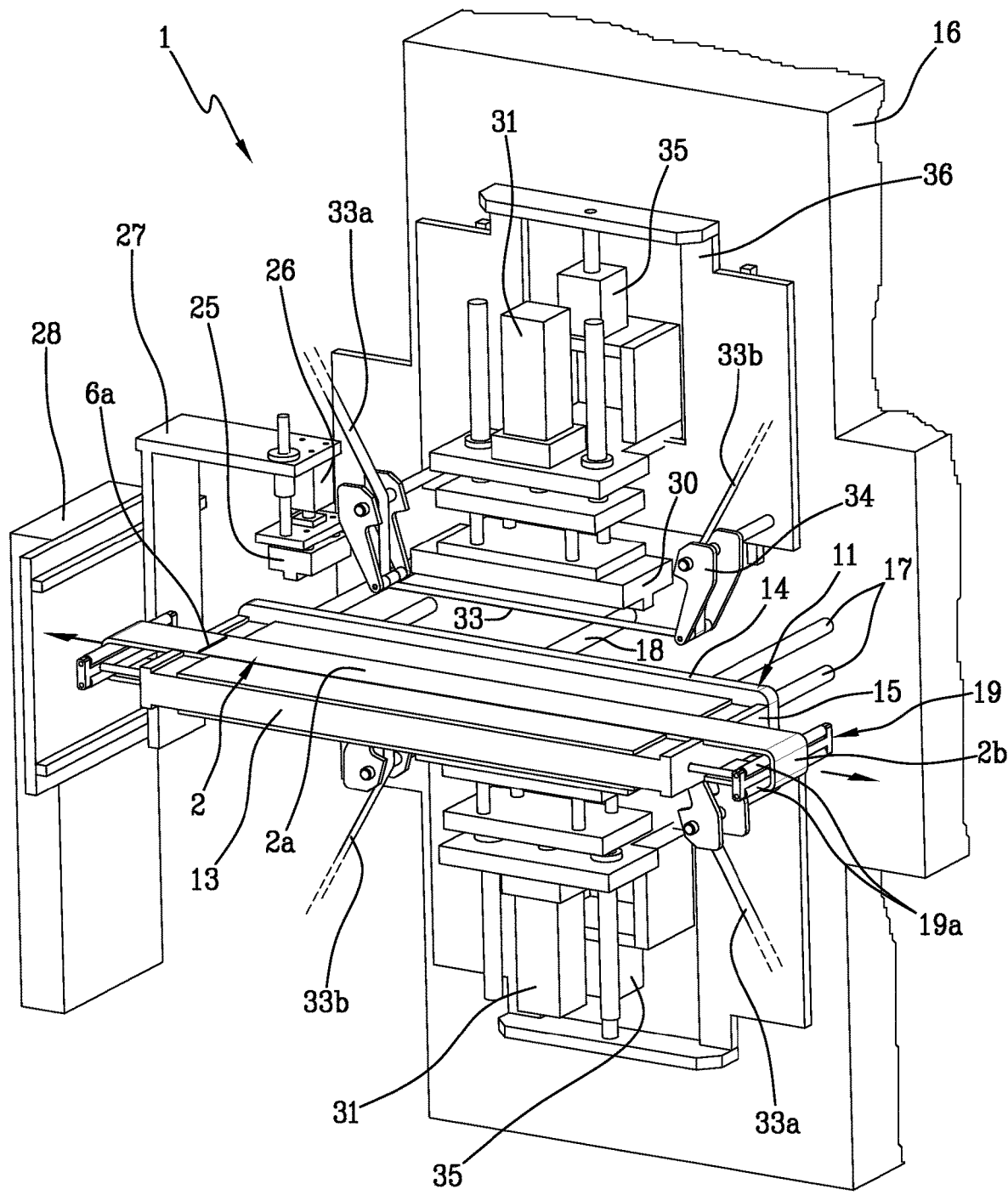
FIG. 4 is a perspective view of the apparatus in a step subsequent to FIGS. 2 and 3, in which the tire is extended against the support table.
Figure 5:
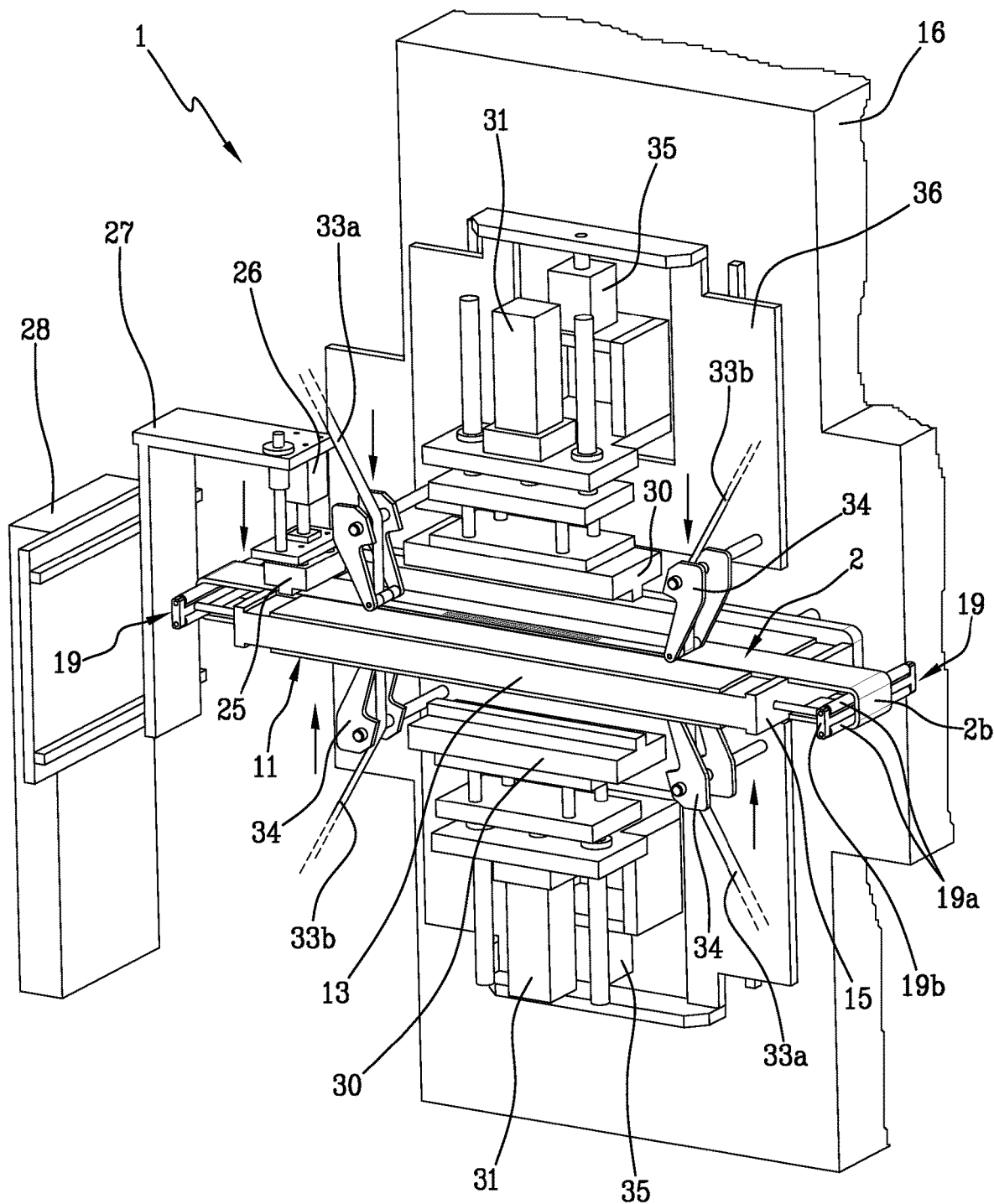
FIG. 5 is a perspective view of the apparatus in a step subsequent to FIG. 4, in which a pressing pad operates against a tread junction while two pairs of labels are approached to the tire on opposite sides of the support table.
Figure 6:
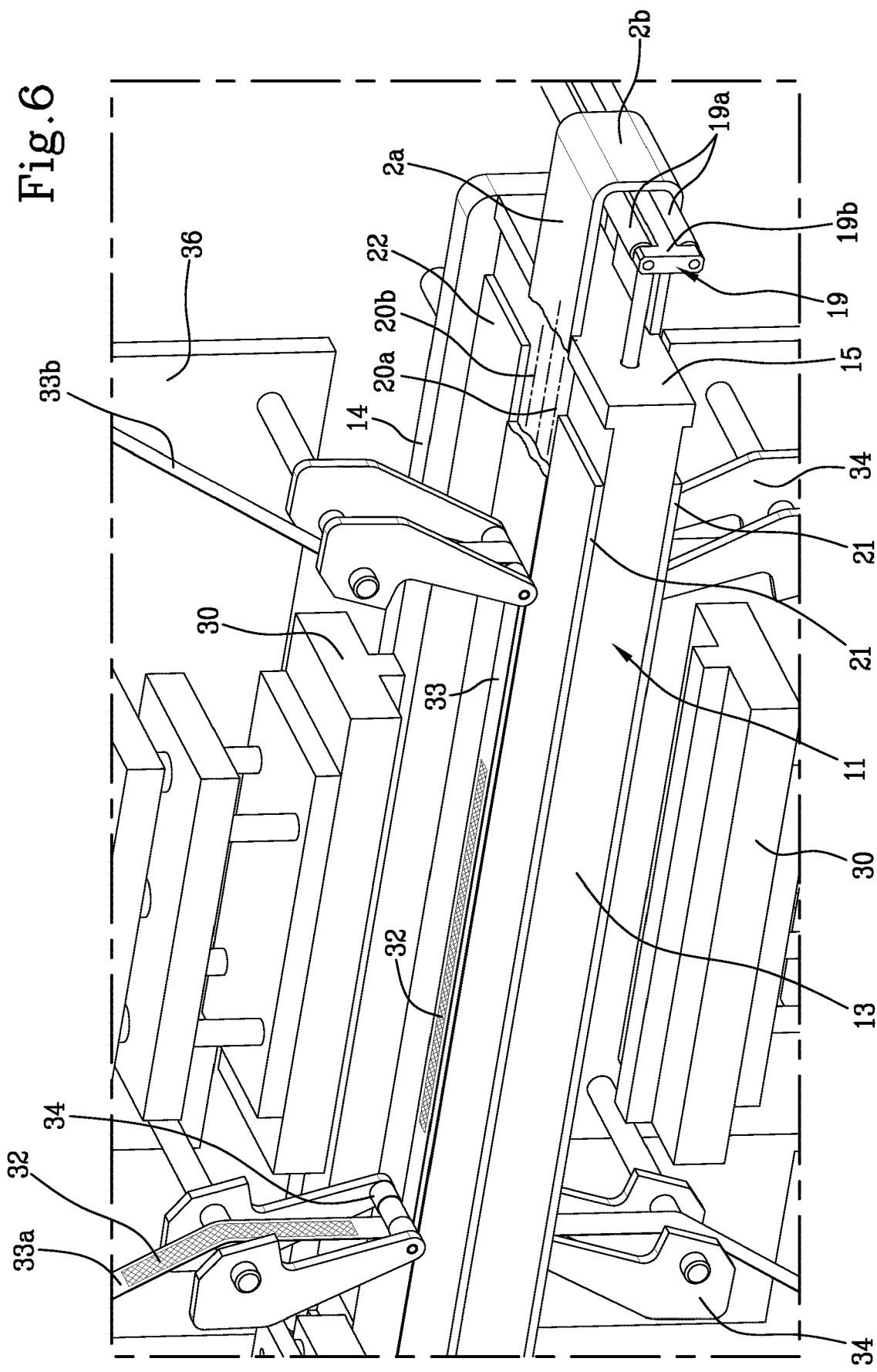
FIG. 6 shows an enlarged detail of FIG. 5.
Figure 7:
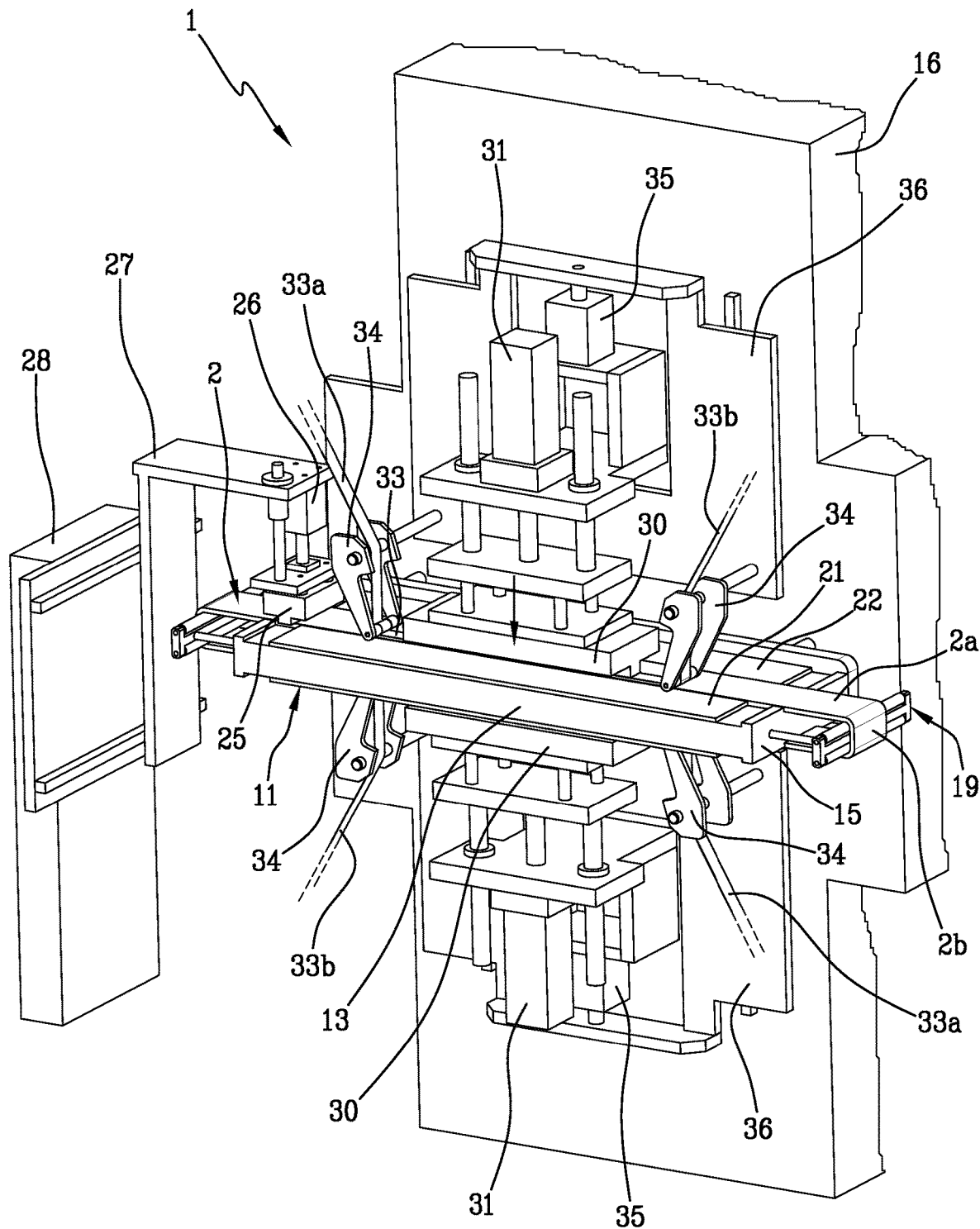
FIG. 7 is a perspective view of the apparatus with two labelling pads in action against the tire for applying the labels.

Such forces of attraction can be conveniently produced by a suction action. In this regard, suction nozzles 24 can be provided which face at least one of the contrast faces 12, preferably distributed along the respective longitudinal containment seat 20, and activatable to hold the tire 2 against the support table 11. By way of illustrative example, FIG. 3 schematically indicates the suction nozzles 24 facing upwards from the contrast face 12. However, the suction nozzles 24 are preferably provided at least on the contrast face 12 facing downwards, to prevent the corresponding main section 2*a* from moving away from the longitudinal containment seat 20 due to its own weight.

Before, after or during the movement of the stretchers 19 which determine the tensioning of the tire 2, the support table 11 is moved along the guide rods 17, from the loading/unloading position to a first work position in which it is approached to the load-bearing structure 16. In this first work position, the pressing area 23 is positioned, together with the tire 2, along the movement path of a presser 25, preferably heated.

The presser 25 is preferably mounted at the end of a thrust actuator 26, for example in the form of a fluid-dynamic cylinder.

Preferably, the thrust actuator 26 is in turn mounted on a slider 27, movable parallel to the guide rods 17, along a guide structure 28 fixed with respect to the load-bearing structure 16.

Upon action of the thrust actuator 26, the presser 25 is adapted to be moved and pushed towards the pressing area 23 carried by the support table 11, to press the tread junction 6*a* carried by the tire 2 fitted around the support table 11. The combined action of pressing and heating exerted by the presser 25 allows the tread junction 6*a* to consolidate and the thickness to be made uniform.

As shown in FIG. 10, the presser 25 is also preferably provided with a marking matrix 29 of the tread junction 6*a*.

The marking matrix 29, facing the support table 11, allows producing an impression (not visible in the drawings) on the surface of the tread band 6, asymmetrical with respect to the axial middle line M of the tire 2, indicative of the orientation assumed from the tire itself during building. For example, this impression can be in the form of an arrow pointing towards the load-bearing structure 16, indicating the bead 5a located on the left side of the building drum 9 during the previous component assembly steps.

Each of the longitudinal containment seats 20 comprises a first lateral portion 20a and a second lateral portion 20b, situated on respectively opposite sides with respect to a longitudinal middle line corresponding to the axial middle line plane M and close to the front shoulder 21 and to the rear shoulder 22, respectively.

The first lateral portion 20a and the second lateral portion 20b correspond to one and the other of the sidewalls 8 of the tire 2 fitted around the support table 11, respectively.

The apparatus 1 further comprises at least one labelling pad 30. Two labelling pads 30 are preferably provided, situated above and below the support table 11, respectively, i.e. each facing one of the contrast faces 12.

The labelling pads 30, each preferably controlled by a labelling actuator 31 made for example in the form of a fluid-dynamic cylinder fixed to the load-bearing structure 16, are movable on respectively opposite sides each towards the respective contrast face 12, to apply at least two labels 32 simultaneously along a circumferential extension of the tire 2.

The labels 32 applied by each labelling pad 30 are preferably carried by a respective labelling tape 33 having an inlet section 33a coming from a reel or other feed member (not shown) and an outlet section 33b connected to a reel or other collection body (not shown). Each labelling tape 33 is suitably guided by means of return elements 34 along a path passing between the respective labelling pad 30 and the support table 11.

At least the return elements 34 can be movable, for example by means of a control actuator 35 operating on a support plate 36, between a rest position in which they move away from the support table 11 (FIGS. 2 to 4 and 8), and a work position in which they approach the tape to the support table 11 (FIGS. 5 to 7 and 9), preferably bringing it against the tire 2 fitted on the latter.

When the support table 11 is in the first work position, the first lateral portion 20a of each longitudinal containment seat 20, and consequently the corresponding sidewall 8 of the tire 2, are located along the movement path of the labelling pads 30 towards the corresponding contrast faces 12 of the support table 11.

The actuation of the labelling pads 30 can therefore be controlled, after the labelling tapes 33 have possibly been approached to the tire 2, to determine the simultaneous application of at least two labels 32 along the sidewall 8 located adjacent to the front shoulders 21, at the first lateral portion 20a of each longitudinal seat.

The pressure exerted by the labelling pads 30, preferably heated and pressed against the main sections 2a of the tire 2, causes a thermal transfer of the labels 32 from the labelling tapes 33 to the sidewall 8 of the tire 2 itself. At least two labels 32 are thus applied simultaneously on the same sidewall 8 of the tire 2, each at one of the main sections 2a.

This operation can conveniently occur simultaneously with the action of the presser 25 on the tread junction 6a.

Once the application of the labels 32 on the sidewall 8 arranged adjacent to the front shoulders 21 is completed, the labelling pads 30 and the respective labelling tapes 33 are moved away from the support table 11.

The support table 11 can therefore be moved from the first work position, to reach a second work position, located between the first work position and the loading/unloading position, as shown in FIGS. 8 and 9.

In the meantime, an activation of the feeding member and of the collecting member causes a sliding of the labelling tapes 33 to position new labels 32 along the movement path of the respective labelling pads 30.

In the second work position, the second lateral portion 20b of each of the longitudinal containment seats 20, and consequently the corresponding sidewall 8 positioned at the rear shoulder 22, are positioned along the movement path of the labelling pads 30 towards the corresponding contrast faces 12 of the support table 11. A new actuation of the labelling pads 30 towards the tire 2, against the labelling tapes 33 interposed between the latter and the pads themselves, causes the transfer of further labels 32 onto the sidewall 8 of the tire 2 positioned at the rear shoulder 22. Therefore at least two labels 32 are applied at different times (two pairs of labels 32 in the example described herein) each on a respective sidewall 8 of the tire 2.

It can be conveniently provided that the pushing action of the presser 25 on the tread junction 6a is maintained during the application of the labels 32 on both sidewalls 8.

In this regard, the presser 25, free to translate along the respective guide structure 28 and pressed against the tread band 6, lends itself to being dragged in the movement of the support table 11 so as to move together with it between the first work position and the second work position.

Once the application of the labels 32 is completed, the presser 25 and the pads are moved away with respect to the support table 11, and the latter is returned to the loading/unloading position, so as to facilitate the removal of the tire 2 after bringing the stretchers 19 close to the terminal sides 15 of the support table 11.

It can be conveniently provided that the labelling processes described above are at least partially carried out during the assembly of the ply(es) 4, bead cores 5, tread band 6 and/or other annular components of another tire 2 on the building drum 9.

When the support table 11 is returned to the loading/unloading position, the longitudinal containment seats 20 are moved away from the movement path of the presser 25 and of the labelling pads 30. The support table 11, once released from the tire 2 provided with labels 32, is adapted to receive the new tire 2 assembled during the previous labelling processes and removed from the building drum 9 to be in turn subjected to a new labelling cycle.

The tire 2 provided with labels 32 and removed from the support table 11 is adapted to be loaded into a vulcanisation mould, and subjected to a moulding and vulcanisation treatment in which, by a combined action of pressing and heating, the molecular structure thereof is stabilised.

When loading the tire 2 into the vulcanisation mould, the tyre 2 may be oriented with the arrow (or other impression produced by the presser 25) facing in a predetermined direction, for example upwards. The arrow or other type of impression will disappear with the execution of the usual pressing of the tire 2 during the moulding and vulcanisation step, but the univocal orientation of the tires inside the mould will facilitate the identification of the origin of any defects found during subsequent checks after vulcanisation is completed.

The invention claimed is:

1. A process for labelling a green tyre for bicycles, comprising:
   fitting the green tyre around a support table;
   positioning, in a pressing area arranged on the support table, a tread junction carried by the green tyre fit around the support table;
   applying at least one label on the green tyre; and
   pressing the tread junction during the application of the at least one label.

2. The process according to claim 1, wherein the action of pressing the tread junction is executed by a presser thrust against the green tyre, interposed between the presser and the support table.

3. The process according to claim 2, wherein fitting the green tyre comprises extending the green tyre according to an elongated configuration wherein a circumferential extension of the green tyre has two main sections substantially parallel to each other, wherein a circumferential extension of the green tyre has two main sections substantially parallel to each other, mutually connected by two U-shaped connector sections.

4. The process according to claim 3, further comprising stretching the green tyre by moving the U-shaped connector sections away from each other before applying the at least one label.

5. The process according to claim 4, wherein stretching the green tyre comprises moving at least one stretcher away from a respective terminal side of the support table.

6. The process according to claim 5, wherein the support table has two respectively opposite contrast faces, operating in abutment each against one of the main sections of the extended green tyre.

7. The process according to claim 6, wherein applying the at least one label comprises pressing a labelling pad against one of the main sections of the extended green tyre.

8. The process according to claim 7, wherein at least two labels are applied, each on a respective sidewall of the green tyre.

9. The process according to claim 8, wherein on one of the respective sidewalls of the green tyre, at least two labels are simultaneously applied, each at one of the main sections of the extended green tyre.

10. The process according to claim 8, wherein the application of the labels on the respective sidewalls occurs in respectively different times.

11. The process according to claim 9, wherein the presser operates in thrust relationship on the tread junction during the application of the labels on both the sidewalls.

12. The process according to claim 11, further comprising producing, on the tread band, an asymmetric impression with respect to the axial middle line plane of the green tyre.

13. The process according to claim 12, wherein on each of the main sections of the extended green tyre, attraction forces are applied against the support table.

14. A process for building tyres for bicycles, comprising:
    on a building drum, assembling a plurality of components in order to manufacture a green tyre;
    executing labelling processes on the green tyre; and
    vulcanising the green tyre;
    wherein the execution of the labelling processes occurs according to the process of claim 13.

15. The process according to claim 14, wherein the labelling processes are at least partially executed during the assembly of annular components of another green tyre on the building drum.

* * * * *